Oct. 18, 1927.
F. F. WULF
1,645,569
DRAFT EVENER
Filed Dec. 28, 1926
3 Sheets-Sheet 1
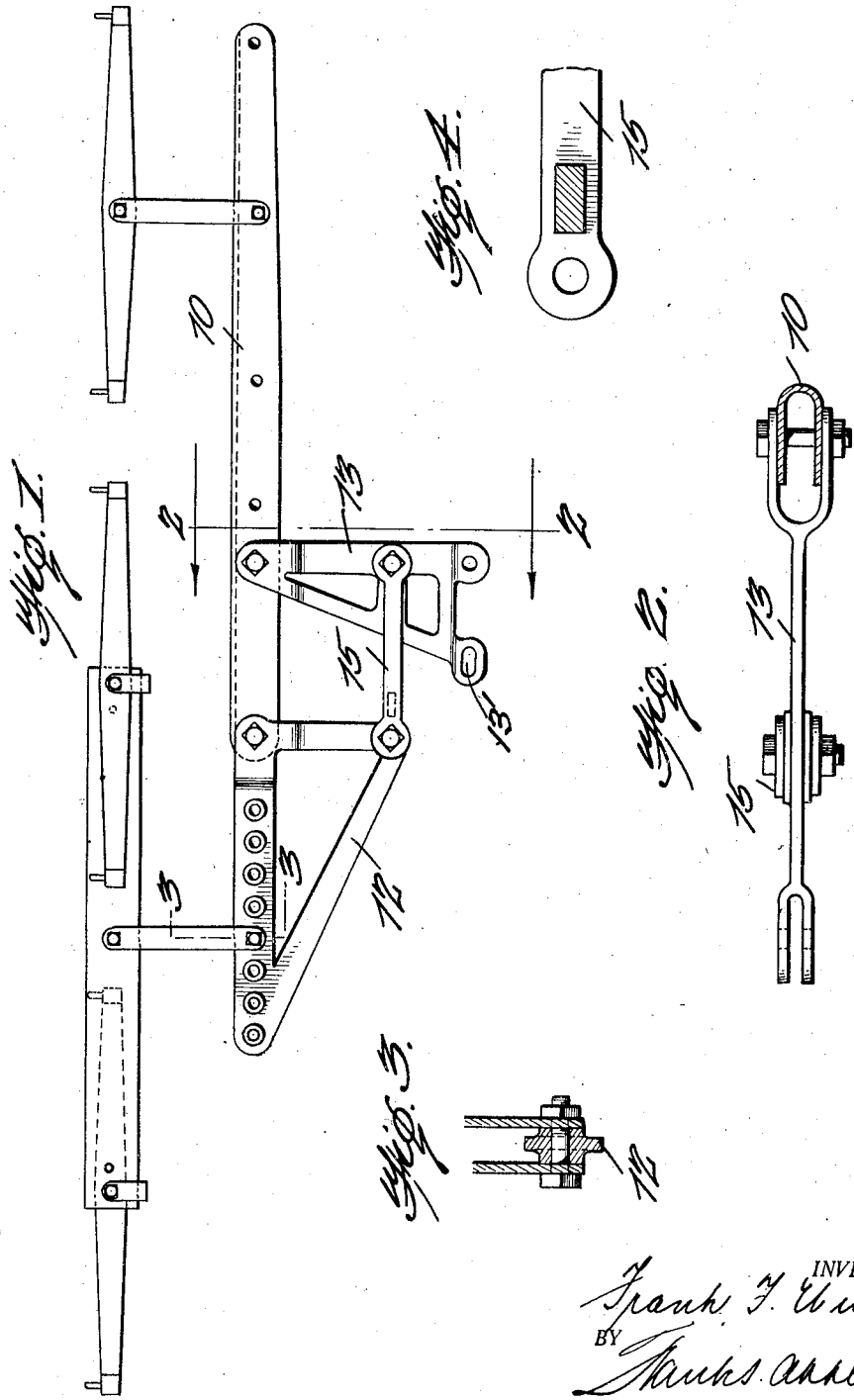
INVENTOR
Frank F. Wulf,
BY
Franks Addleman
ATTORNEY.

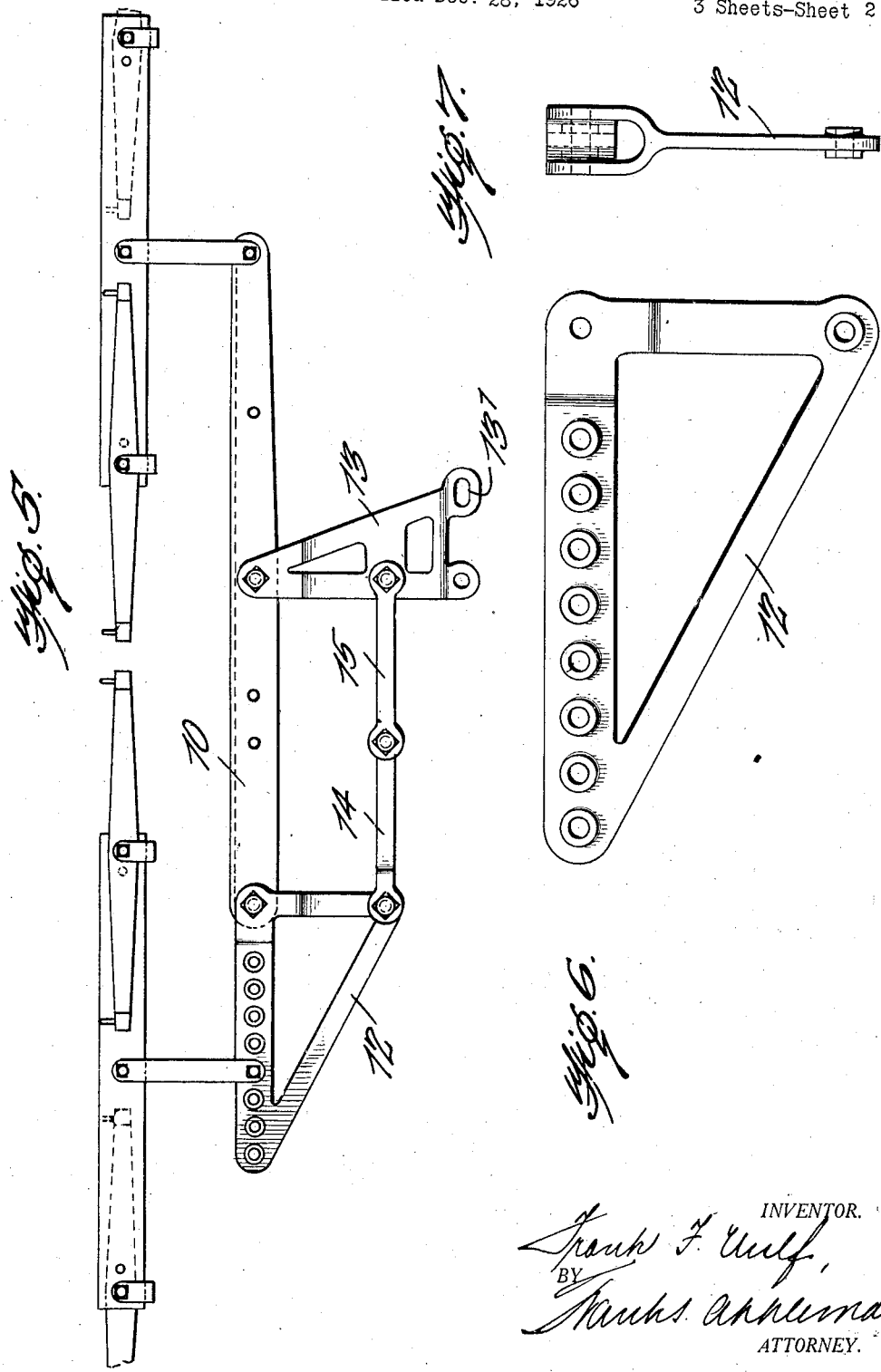

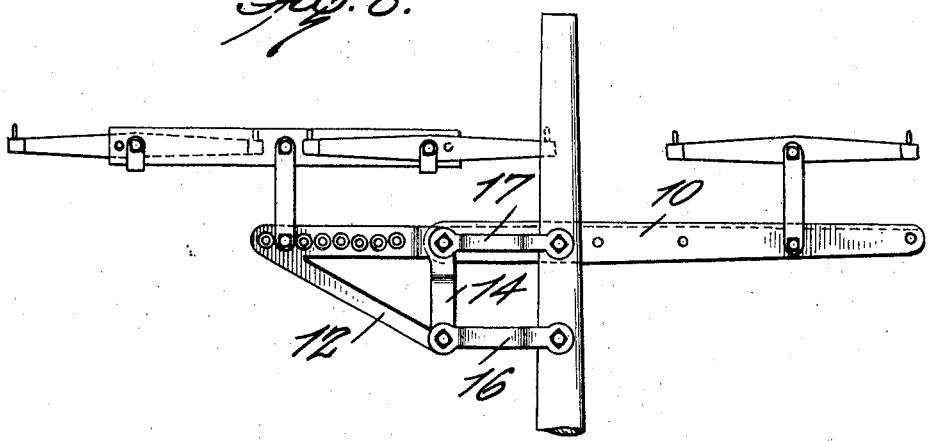
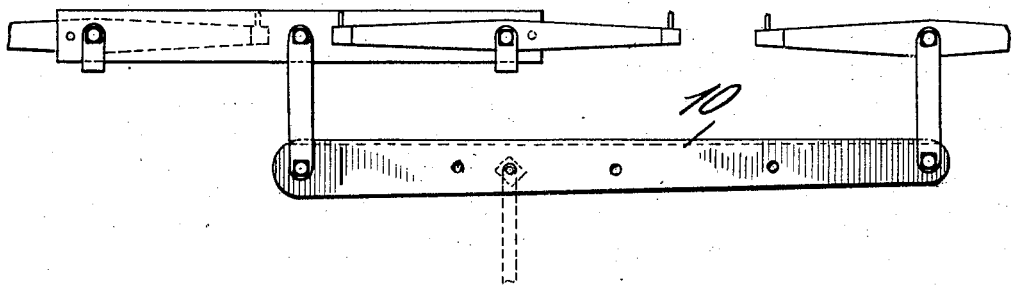

Patented Oct. 18, 1927.

1,645,569

UNITED STATES PATENT OFFICE.

FRANK F. WULF, OF NELIGH, NEBRASKA.

DRAFT EVENER.

Application filed December 28, 1926. Serial No. 157,535.

This invention relates to draft eveners or equalizers and has for its object to provide means whereby the parts may be associated in different ways to accord with the number of draft animals which are hitched thereto for use in connection with implements having either a beam or a pole.

A further object of this invention is to provide a draft equalizer, the parts individually being of rigid construction and separable to admit of being associated in various ways to meet conditions which arise in use as to the character of the implement and the number of draft animals which are hitched abreast thereto and to admit of the positioning of one of the draft animals of a team either to the right or left side of the team.

The invention further consists in the combination with a lever or bar, of a bell-crank lever, which is fulcrumed thereto, the short arm of the bell-crank lever being connected to a pole or clevis by a link connection, such parts when associated with trees providing either a three horse or four horse evener or equalizer.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1 illustrates a plan view of a draft equalizer showing the parts arranged for three draft animals and attachment to a clevis of a plow beam;

Figure 2 illustrates a detail view, partly in section taken on the line 2—2 of Figure 1;

Figure 3 illustrates a detail sectional view on the line 3—3 of Figure 1;

Figure 4 illustrates a detail sectional view of a part of one of the connecting links;

Figure 5 illustrates a plan view showing a modification of my invention arranged to provide a four horse equalizer;

Figure 6 illustrates a plan view of a bell crank shaped member;

Figure 7 illustrates an end elevation of the member shown in Figure 6;

Figure 8 illustrates a plan view of a second modification of my invention showing same as a three horse evener applied to a tongue or pole of an implement; and Figure 9 illustrates a plan view showing a use of an evener bar in connection with a doubletree and a singletree to provide a three horse evener or equalizer.

Referring to the drawings which show the preferred form of my invention, 10 designates an oscillatory bar preferably made up from sheet metal bent in U-shaped form, the same having therethrough end bolt receiving apertures, three intermediate and equally spaced bolt receiving apertures, and an auxiliary bolt receiving aperture located to one side of an intermediate aperture. To one end of the bar 10 is secured an extension member 12 in the form of a bell crank lever, the same being removably connected to one end of the bar 10 by a bolt, the short end of the lever 12 being connected with an angular clevis engaging member 13 by links 15, the links being connected adjacent to one end as shown by Figure 4.

The extension member or bell crank lever 12, shown in detail in Figures 6 and 7, comprises a front member having a plurality of apertures which are comparatively closely spaced, and reenforced by bending or swaging the metal about the openings. The right angle portion of the part 12 is spread to overlie the ends of the bar 10 when bolted thereto. The short arm of the lever or member 12 is appropriately connected to an angular clevis engaging member 13 which is maintained in pivotal engagement with the end of the bar 10 and intermediately with the end of the short arm of the lever 12 by the link 15.

When the device is used as a three horse equalizer as in Figure 1, the equalizer bar 10 is connected by a strap to a singletree and the lever 12 is fulcrumed preferably to the opposite end of the equalizer bar and is connected to a doubletree by strap irons, and said doubletree carries a pair of singletrees. The angular connecting member 13 is secured to a clevis on the end of a plow beam by bolts or pins.

In Figure 5 of the drawings, I have shown my invention applied to a four horse equalizer and in this case, the coupling member 13 is applied to the central opening of the equalizer bar 10 in a reversed position from that in which it is shown in Figure 1. When the coupling member 13 is applied, as shown in Figure 5, an additional link 14 is employed which is connected with the link 15.

The member 13 is of flat triangular formation spread or bifurcated at the apex so that in use, it will overlie both sides of the bar 10 and adjacent to the apex is formed a bolt or pin receiving aperture and at a distance equal to the short arm of the bell crank lever is an aperture for connecting a link with the short arm of said lever. The diverging arm of the part 13 is provided with a slot or elongated opening 13' and opposite thereto in line with the aperture adjacent to the apex of the member 13 and said apex is a bolt receiving aperture. The angular coupling member having in its rear end a slot and a bolt receiving opening admits of said part being connected with horizontal clevises such as are in use upon plow beams.

It will be noted that the short arm of bell crank lever 12, bar 10, connecter 13 and link, form a parallelogram in which one side is fixedly attached to the machine and that the other points of connection are movable, resulting in an arrangement of parts which provides an equalizer of such construction as to obviate the use of flexible connections.

Figure 8 shows a device where my improvement is applied to an implement having a draft tongue and, in the present case, the bell crank lever 12 has links 16 and 17 which are pivoted to the tongue and to the ends of the short arm or member 14 of the bell crank lever 12.

Figure 9 of the drawing shows the bar 10 having perforations or apertures as previously described and to which a singletree is secured at one end and a doubletree at the other end to provide a three horse equalizer so that the bar 10 may be used, when desired, with the usual clevis.

From the foregoing description it will be noted that the bar 10, bell crank 12 and links are connected to a clevis, and when a pole is present, the clevis connector 13 may be discarded and an extra bolt receiving aperture through the pole preserves the parallelogram arrangement of the parts which extend rearward of the bar 10.

I claim—

1. In a draft evener, the combination with an oscillatory bar, a fixed member to which the bar is fulcrumed, an angular lever pivoted to one end of the bar, means for connecting a rearward extending member of said angular lever to a rearward portion of the fixed member.

2. In a draft evener, the combination with a bar, a coupling member maintained in substantially rigid engagement with a support, a bell crank, a link connection between the bell crank and the coupling member, and means for connecting draft devices with the bar and with the bell crank whereby the link connection will be maintained in parallelism with the bar.

3. A draft evener comprising a bar fulcrumed at an intermediate point upon a fixed support, a bell crank lever associated with one end of said bar, means for connecting the short arm of the bell crank lever with the support at a point which is the same distance from the bar as the end of the short arm of the lever, and draft appliances connected to the bar and bell crank lever for the purpose set forth.

4. A draft evener for three or four horse draft animals abreast comprising a substantially rigid member, an oscillating bar provided with a longitudinal series of bolt receiving apertures which are located at an equal distance one from the other, means for supporting the bar and providing a fulcrum therefor, a bell crank lever which is fulcrumed to one end of the bar, one arm forming an extension thereof, the other end of the arm extending rearward from the fulcrum thereof, means for connecting the bell crank with the support for oscillating the bar, and draft means connected to the bell crank lever and to the bar on an opposite side of the supporting means for the bar.

5. In a draft evener, the combination with a bar mounted for oscillation, the same being U-shaped in cross section, an extension member therefor shaped to provide a bell crank lever, the junction of its arms being bifurcated to overlie an end portion of said bar; the long arm of the extension member having therethrough spaced bolt receiving apertures with encircling reenforcements, and means for connecting the short arm of the lever to a member which is also connected to the bar.

FRANK F. WULF.